(12) United States Patent
Sato et al.

(10) Patent No.: US 8,221,274 B2
(45) Date of Patent: Jul. 17, 2012

(54) CHAIN TENSIONER

(75) Inventors: Takanobu Sato, Iwata (JP); Seiji Sato, Iwata (JP); Kouichi Onimaru, Iwata (JP)

(73) Assignee: NTN Corporation, Osaka (JP)

( * ) Notice: Subject to any disclaimer, the term of this patent is extended or adjusted under 35 U.S.C. 154(b) by 624 days.

(21) Appl. No.: 12/216,521

(22) Filed: Jul. 7, 2008

(65) Prior Publication Data

US 2009/0017949 A1  Jan. 15, 2009

(30) Foreign Application Priority Data

Jul. 9, 2007 (JP) .................................. 2007-179495

(51) Int. Cl.
*F16H 7/08* (2006.01)
(52) U.S. Cl. ......................... 474/110; 474/109; 474/138
(58) Field of Classification Search .......... 474/134–138, 474/101, 117–118, 133, 109–110
See application file for complete search history.

(56) References Cited

U.S. PATENT DOCUMENTS

| | | | |
|---|---|---|---|
| 7,775,921 B2 * | 8/2010 | Izutsu et al. ................... | 474/110 |
| 2004/0266571 A1 * | 12/2004 | Izutsu et al. ................... | 474/110 |
| 2006/0003859 A1 | 1/2006 | Sato et al. | |
| 2006/0270500 A1 * | 11/2006 | Yamamoto et al. ........... | 474/109 |
| 2007/0213152 A1 * | 9/2007 | Yamamoto et al. ........... | 474/109 |
| 2008/0096707 A1 * | 4/2008 | Sato et al. ...................... | 474/111 |

FOREIGN PATENT DOCUMENTS

| | | |
|---|---|---|
| JP | 11-264049 | 9/1999 |
| JP | 2001-227603 | 8/2001 |
| JP | 2002-357250 | 12/2002 |
| JP | 2006-017214 | 1/2006 |
| JP | 2006-116593 | 5/2006 |

OTHER PUBLICATIONS

Notice of Reasons for Rejection issued Oct. 25, 2011 in counterpart application JP 2007-179495 (with partial English translation).

* cited by examiner

*Primary Examiner* — William A Rivera
(74) *Attorney, Agent, or Firm* — Wenderoth, Lind & Ponack, L.L.P.

(57) ABSTRACT

A chain tensioner includes a plunger axially slidable in a cylinder to define a pressure chamber, filled with hydraulic oil, whose volume is variable upon axial plunger movement. A restricted passage defined between the plunger and the cylinder communicates the chamber with outside. A spring biases the plunger to increase the pressure chamber volume. An oil supply passage supplies oil to the pressure chamber and a check valve allows only oil flow into the pressure chamber, and includes an annular valve seat, a check ball movable into and out of contact with the valve seat, and a check ball retainer formed by drawing. The retainer includes a tubular portion with a bottom at one end. The tubular portion has an opening, formed by punching outwardly, through which oil can flow in and out. The opening extends to a border between the tubular portion and the bottom of the retainer.

15 Claims, 7 Drawing Sheets

Results of retainer fatigue test
(200Hz, load control, wall thickness 0.5mm)

Results of retainer fatigue test
(200Hz, load control, wall thickness 0.5mm)

CHAIN TENSIONER

BACKGROUND OF THE INVENTION

This invention relates to a chain tensioner for keeping constant the tension of a timing chain for driving camshafts in an automotive engine.

In an automotive engine, the rotation of the crankshaft is transmitted to camshafts through a timing chain to rotate the camshafts, thereby repeatedly opening and closing valves of combustion chambers. In such an engine, in order to keep the tension of the chain within a proper range, a tension adjusting device is frequently used which comprises a chain guide pivotable about a shaft, and a chain tensioner biasing the chain guide in the direction to press the chain guide against the chain.

Such chain tensioners typically comprise a cylinder having a closed end, a plunger axially slidably inserted in the cylinder for pressing a chain. The plunger defines in the cylinder a pressure chamber filled with hydraulic oil. The volume of the pressure chamber is variable with the axial movement of the plunger. The plunger is biased by a spring in the direction to increase the volume of the pressure chamber. The cylinder is formed with an oil supply passage through which the pressure chamber communicates with the outside of the cylinder. The oil supply passage is provided with a check valve which allows only a flow of hydraulic oil through the oil supply passage from the outside of the cylinder to the pressure chamber (JP Patent Publication 2006-17214).

In this chain tensioner, when the tension of the chain decreases, the plunger is pushed out of the cylinder by the spring, thereby re-tensioning the chain. When the plunger moves in this direction, the hydraulic oil is supplied into the pressure chamber through the oil supply passage, so that the plunger moves quickly, thus quickly re-tensioning the chain.

When the tension of the chain increases, the plunger retracts under the tension of the chain, thereby absorbing the tension of the chain. When the plunger retracts, the check valve closes, and hydraulic oil in the pressure chamber leaks through a restricted passage defined between the sliding surfaces of the plunger and the cylinder to the outside of the cylinder. The plunger can thus retract slowly, so that the tension of the chain stabilizes.

The check valve comprises an annular valve seat, a check ball which is movable into and out of contact with the valve seat, and a retainer retaining the check ball and comprising a tubular portion and a bottom at one end of the tubular portion. The tubular portion of the retainer is formed with an opening through which hydraulic oil can flow into and out of the retainer. The opening extends to a border between the tubular portion and the bottom of the retainer. The retainer is formed by drawing a circular blank having the opening formed by punching.

While the engine is running, fluctuations in torque of the crankshaft and rotational resistance of the camshafts are transmitted to the chain, so that the pressure in the pressure chamber fluctuates with high frequency. In the case of a four-cylinder engine, torque fluctuates twice per rotation of the crankshaft. Thus, while this engine is rotating at 6000 rpm, the pressure in the pressure chamber fluctuates with a frequency of 200 Hz. When the pressure in the pressure chamber fluctuates with such high frequency, the check ball of the check valve repeatedly collide against the bottom of the retainer, thus producing stress at the bent portion of the retainer, i.e. the border between the bottom and the tubular portion of the retainer. At this time, the radially inner portion of the border is subjected to higher stress than is the radially outer portion of the border because the former has a smaller radius of curvature than the latter.

Figure 9:
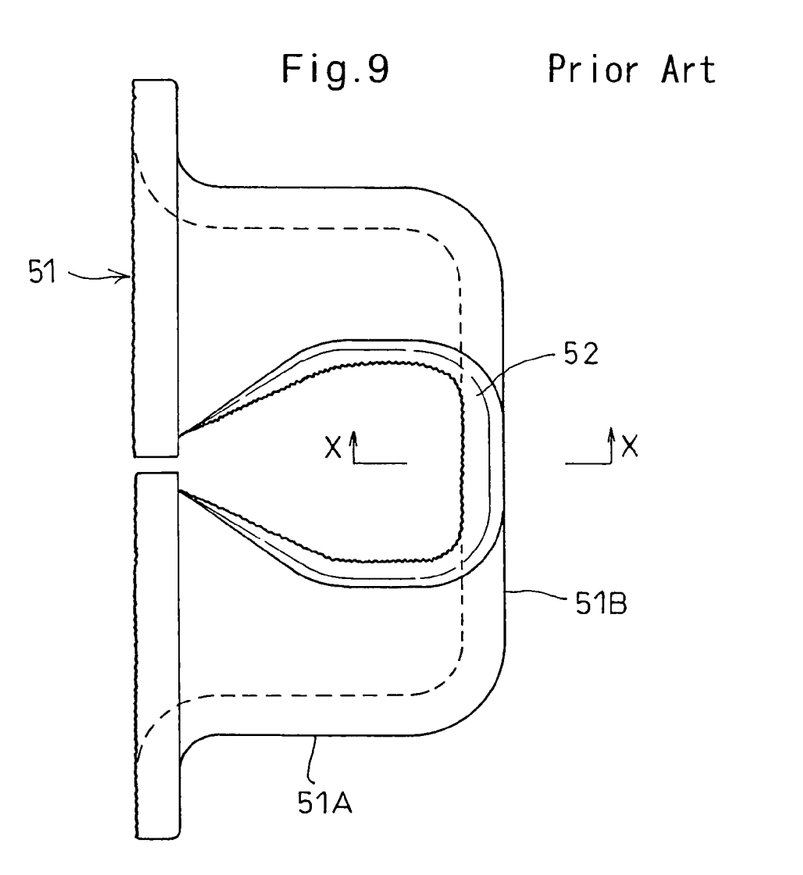
FIG. 9 is an enlarged view of a retainer of a conventional check valve.
Figure 10:
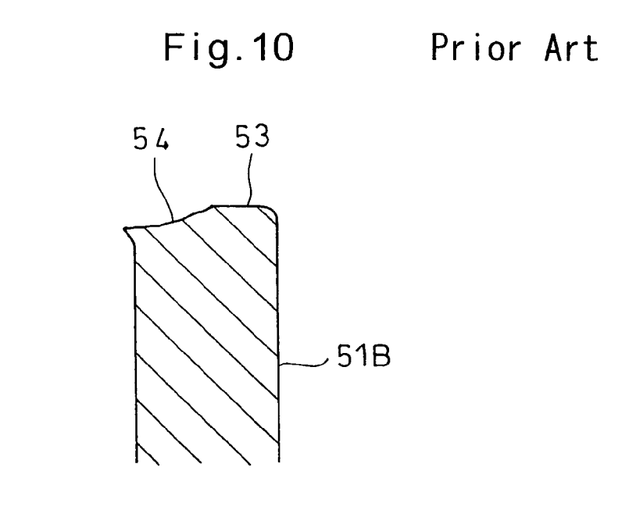
FIG. 10 is an enlarged sectional view taken along line X-X of FIG. 9.

FIG. 9 shows the abovementioned conventional retainer 51. As shown, the opening 52 in the tubular portion 51A of the retainer 51 is formed by punching the tubular portion from outside to inside thereof. Thus, as shown in FIG. 10, the punched section formed by punching comprises a shear surface 53 and a ruptured surface 54 which is rougher than the shear surface 53 and located radially inwardly of the shear surface 53. Thus, when the check ball (not shown) collides against the bottom 51B of the retainer, the ruptured surface 54 tends to be subjected to higher stress than the shear surface 53. Since the ruptured surface 54 tends to be subjected to higher stress and is rougher than the shear surface 53, cracks tend to develop in the ruptured surface 54 due to stress concentration, which can result in fatigue failure of the retainer 51.

An object of the present invention is to improve the durability of the retainer of the check valve, thereby improving the reliability of the chain tensioner.

SUMMARY OF THE INVENTION

In order to achieve this object, the opening of the retainer is formed by punching the retainer from inside to outside thereof.

In one arrangement, the retainer is formed by drawing a circular blank having first and second sides such that the first and second sides of the blank become outer and inner sides of the retainer, respectively, the opening being formed by punching the blank before the blank is formed into the retainer by drawing, wherein a punched section formed by punching the blank comprises a ruptured surface and a shear surface located nearer to the second side than is the ruptured surface.

The retainer may be made of steel and subjected to soft nitriding, carburizing/quenching or carbonitriding/quenching.

Preferably, the surface of this retainer is further subjected to shot peening. Such shot peening is preferably carried out so as to raise the surface temperature of the retainer to the A3 transformation point or higher. Also, such shot peening is preferably carried out by throwing shots having diameters of 20 to 200 μm against the surface of the retainer at a speed of 50 m/minute.

Since the opening of the retainer is formed by punching the retainer from inside to outside thereof, the ruptured surface is located radially outwardly of the shear surface. Thus, when the check ball collides against the bottom of the retainer, the ruptured surface is subjected to lower stress than the shear surface. This minimizes the possibility of formation of cracks in the ruptured surface due to stress concentration.

In the arrangement in which the retainer is made of steel and subjected to soft nitriding, carburizing/quenching or carbonitriding/quenching, the surface hardness of the retainer is high, so that the retainer is more durable.

By further subjecting the surface of this retainer to shot peening, residual compressive stress is produced on the surface of the retainer, so that the fatigue strength of the retainer further increases.

By carrying out the shot peening so as to raise the surface temperature of the retainer to the A3 transformation point or higher, the residual austenite on the surface of the retainer turns into martensite, and also, the surface structure of the retainer is recrystallized and becomes fine. This further increases the fatigue strength of the retainer.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
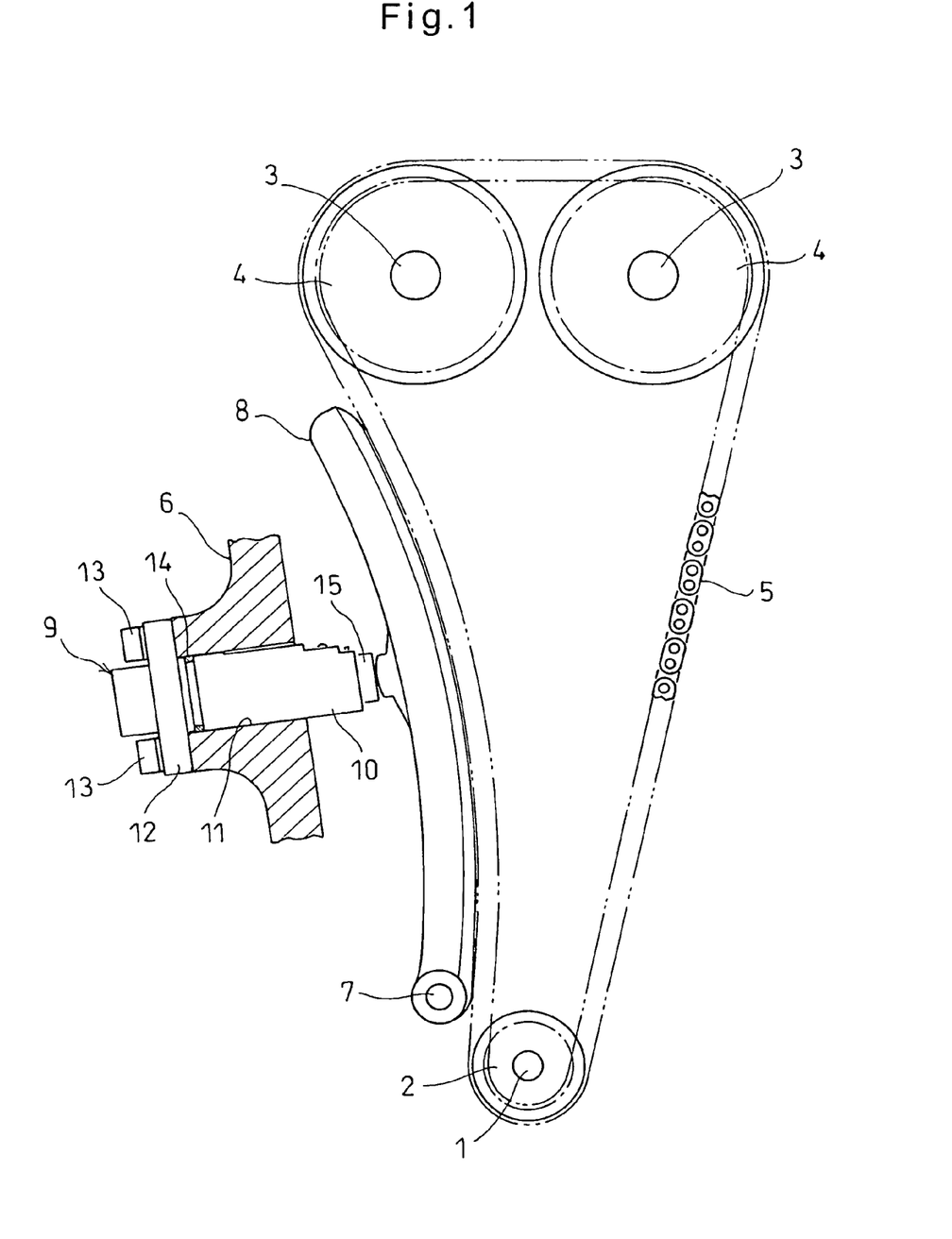
FIG. 1 is a front view of a chain transmission device including a chain tensioner embodying the present invention.

FIG. 1 shows a chain transmission device which includes a chain tensioner embodying the present invention. The chain transmission device further includes a sprocket 2 fixed to a crankshaft 1 of an engine, sprockets 4 fixed to respective camshafts 3, and a chain 5 through which the sprockets 2 and 4 are coupled together. Thus, through the chain 5, the rotation of the crankshaft 1 is transmitted to the camshafts 3, thereby repeatedly opening and closing the valves (not shown) of combustion chambers by the rotation of the camshafts 3. The sprockets 2 and 4 are received in an engine cover 6.

In the engine, a chain guide 8 is also mounted which is pivotable about a shaft 7. A chain tensioner 9 is mounted to the engine cover 6 to bias the chain guide 8 against the chain 5.

The chain tensioner 9 includes a cylinder 10 which is inserted in a tensioner mounting hole 11 formed in the engine cover 6 and having a flange 12 integrally formed on the outer periphery thereof and fixed to the engine cover 6 by bolts 13. On the outer periphery of the cylinder 10, an O-ring 14 is fitted to prevent leakage of hydraulic oil from the engine.

Figure 2:
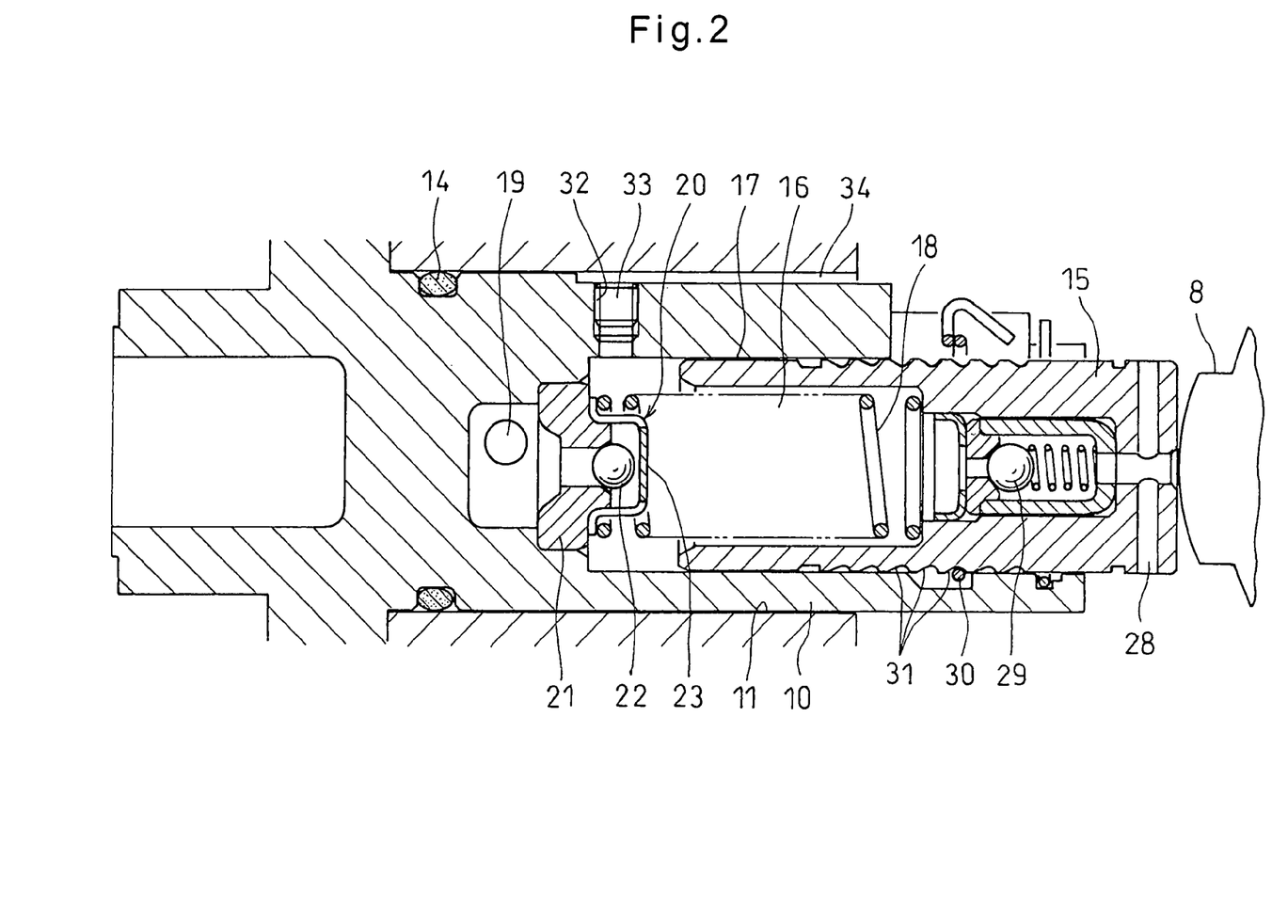
FIG. 2 is an enlarged sectional view of the chain tensioner shown in FIG. 1.

As shown in FIG. 2, the cylinder 10 has an open front end which is located in the interior of the engine cover 6 and a closed rear end. A plunger 15 is axially slidably mounted in the cylinder to press the chain. The plunger 15 defines a pressure chamber 16 in the cylinder 10.

Between the sliding surfaces of the plunger 15 and the cylinder 10, an extremely narrow leakage gap 17 (restricted passage) is formed through which the pressure chamber 16 communicates with the outside of the cylinder 10. The leakage gap 17 restricts the flow of hydraulic oil from the pressure chamber 16 to the outside of the cylinder 10.

The plunger 15 is biased by a spring 18 mounted in the pressure chamber 16 in a direction in which the volume of the pressure chamber 16 increases. The cylinder 10 is formed with an oil supply passage 19 extending from the outside of the cylinder 10 to the pressure chamber 16. The pressure chamber 16 is filled with hydraulic oil.

At the end of the oil supply passage 19 facing the pressure chamber 16, a check valve 20 is provided which allows only a flow of hydraulic oil from the outside of the cylinder 10 into the pressure chamber 16. The check valve 20 comprises an annular valve seat 21 pressed into the cylinder 10, a check ball 22 that can be selectively brought into and out of contact with the valve seat 21, and a retainer 23 retaining the check ball 22.

Figure 3:
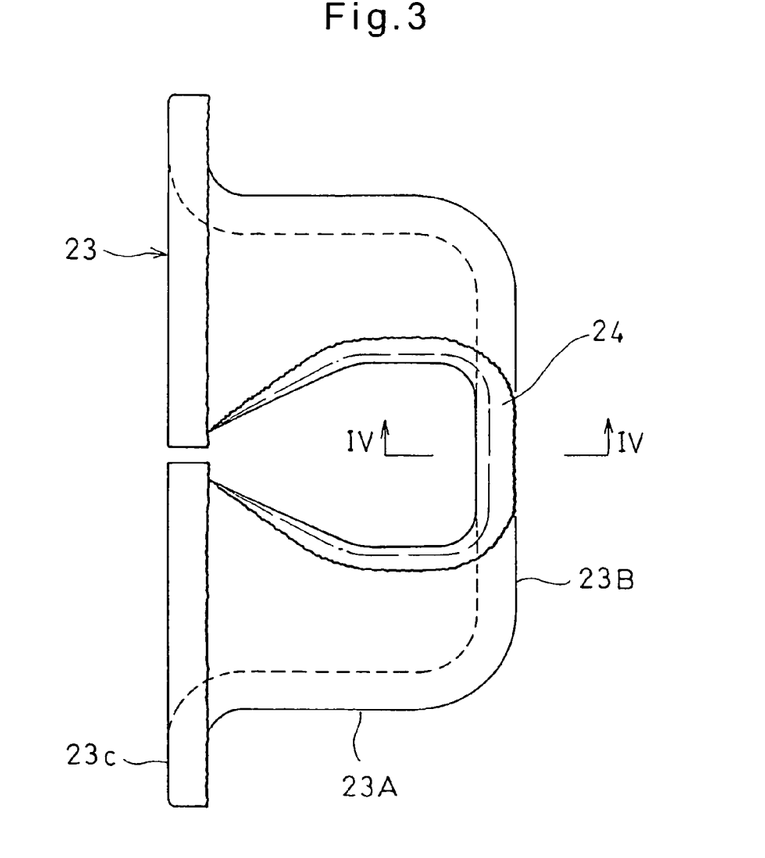
FIG. 3 is an enlarged view of a retainer of a check valve shown in FIG. 2.

As shown in FIG. 3, the retainer 23 comprises a tubular portion 23A, a bottom 23B formed at one end of the tubular portion 23A, and a radially outwardly extending flange 23C formed at the other end of the tubular portion 23A. The retainer 23 is formed by drawing a metal sheet. An opening 24 is formed through the metal sheet so as to extend from the outer edge of the flange 23C, across the tubular portion 23A, to the borderline between the tubular portion 23A and the bottom 23B. Through the opening 24, hydraulic oil flows into and out of the retainer 23.

Figure 4:
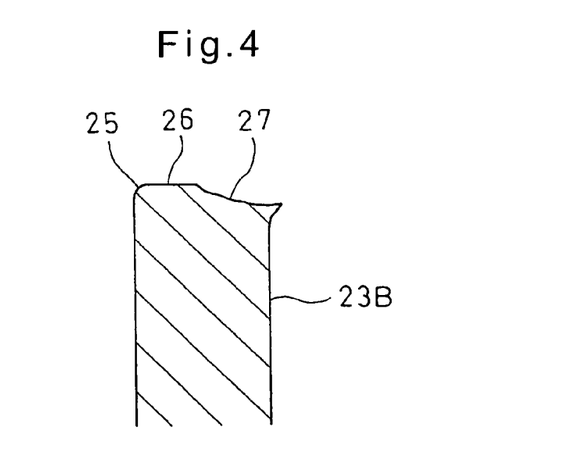
FIG. 4 is an enlarged sectional view taken along line IV-IV of FIG. 3.

The opening 24 is formed by punching the retainer 23 from inside to outside thereof. Thus, as shown in FIG. 4, a punched edge surface, which defines the opening 24, comprises, from inside to outside, a rounded surface 25, a shear surface 26 and a ruptured surface 27. The rounded surface 25 is formed when the punch (not shown) is pushed into the material forming the retainer and the material is pulled by the punch. The shear surface 26 is formed when the material forming the retainer is cut by the punch. The ruptured surface 27 is an irregular rough surface formed when the material forming the retainer is torn off by the punch and, as shown in FIG. 4, is rougher than the shear surface 26. The retainer 23 may be formed by drawing a circular blank sheet having the opening 24 formed by punching so that the ruptured surface 27 is located outwardly of the shear surface 26.

The plunger 15 is formed with a relief passage 28 through which the pressure chamber 16 communicates with the engine. A relief valve 29 is provided at the opening of the relief passage 28 facing the pressure chamber 16. The relief valve 29 is configured to open if the pressure in the pressure chamber 16 exceeds a predetermined pressure.

As shown in FIG. 2, a register ring 30 is elastically pressed against the outer periphery of the plunger 15. The register ring 30 is engageable in any of a plurality of axially spaced ring-engaging grooves 31 formed in the outer periphery of the plunger 15.

Each of the ring-engaging grooves 31 has an asymmetrical axial section such that when the plunger 15 is pushed in the direction to increase the volume of the pressure chamber 16, the register ring 30 radially expands, and moves from one of the ring-engaging grooves 30 into the immediately rear groove 30, thus allowing the axial movement of the plunger 15 in this direction. But when the plunger 15 is pushed in the direction to reduce the volume of the pressure chamber 16, the register ring 30 engages the inner surface of the ring-engaging groove 31, thus preventing the axial movement of the plunger 15 in this direction.

The cylinder 10 is formed with a threaded hole 32 extending from the pressure chamber 16 to the outer periphery of the cylinder 10. An externally threaded part 33 is in threaded engagement in the threaded hole 32. An air vent passage 34 is defined between the outer periphery of the cylinder 10 and the inner periphery of the tensioner-mounting hole 11 to extend from the threaded hole 32 to the engine. With this arrangement, any air that may enter the pressure chamber 16 is released into the engine through the gap between the inner periphery of the threaded hole 32 and the externally threaded part 33, and the air vent passage 34.

The operation of this chain tensioner 9 is now described.

When the tension of the chain 5 decreases, the plunger 15 is moved by the spring 18 in the direction to increase the volume of the pressure chamber 16, thereby re-tensioning the chain 5. When the plunger 15 moves in this direction, hydraulic oil is quickly supplied into the pressure chamber 16 through the oil supply passage 19, so that the plunger 15 moves quickly, thereby quickly re-tensioning the chain 5.

When the chain 5 is stretched, the register ring 30 moves from one of the ring-engaging grooves 31 to the immediately rear groove 30, thereby re-tensioning the chain 5.

When the tension of the chain 5 increases, the plunger 15 moves in the direction to reduce the volume of the pressure chamber 16 under the tension of the chain 5, thereby reducing the tension of the chain. When the plunger 15 begins to move in this direction, the check valve 20 closes, and hydraulic oil in the pressure chamber 16 leaks through the leakage gap 17 to outside the cylinder 10, so that the plunger 15 moves slowly, thereby keeping the tension of the chain 5 at a stable level.

If the tension of the chain 5 increases sharply, the pressure in the pressure chamber 16 increases to a level at which the relief valve 29 opens. When the relief valve 29 opens, hydraulic oil in the pressure chamber 16 is released through the relief passage 28 into the engine. Thus, the plunger 15 moves quickly, thereby preventing over-tensioning of the chain.

In this chain tensioner 9, because fluctuations in torque of the crankshaft 1 and fluctuations in rotational resistance of the camshafts 3 are transmitted to the chain while the engine is running, the pressure in the pressure chamber fluctuates with high frequency. This causes the check ball 22 to repeatedly collide against the bottom 23B of the retainer 23. Thus, higher stress is applied to the radially inner portion of the border between the tubular portion 23A and the bottom 23B than to its radially outer portion because the former has a smaller radius of curvature than the latter. According to the present invention, because the opening 24 is formed such that the ruptured surface 27, which is more likely to suffer cracks than the shear surface 26, is located radially outwardly of the shear surface 26, the ruptured surface 27 is subjected to lower stress than the shear surface 26. Thus, the ruptured surface 27 is less likely to suffer cracks due to stress concentration.

The retainer 23 is made of steel. The retainer 23 is preferably subjected to carburizing/quenching or carbonitriding/quenching. By carrying out this treatment, because a carburized layer or a carbonitrided layer is formed on the surface of the retainer 23, and the austenite forming the retainer 23 turns into martensite, the surface hardness of the retainer 23 increases, thus increasing its durability. The durability of the retainer 23 can also be increased by subjecting the retainer 23 to soft nitriding.

Preferably, the surface of the retainer 23 is further subjected to shot peening because by shot peening, residual compressive stress is produced on the surface of the retainer 23, so that the fatigue strength of the retainer 23 increases. If such shot peening is carried out such that the surface temperature of the retainer 23 increases to the A3 transformation point or higher, the residual austenite on the surface of the retainer 23 turns into martensite, and also, the surface structure of the retainer 23 is recrystallized and becomes fine. This further increases the fatigue strength of the retainer 23. Such shot peening may be carried out by throwing shots having diameters of 20 to 200 μm against the surface of the retainer 23 at a speed of not less than 50 m/minute.

In the embodiment, the opening 24 extends from the outer edge of the flange 23C, across the tubular portion 23A, to the border between the tubular portion 23A and the bottom 23B so that the retainer 23 can be easily formed by drawing. But the opening 24 may extend from the border between the tubular portion 23A and the bottom 23B and terminate at the center of the tubular portion 23A. It is important that the opening 24 be present at the border between the tubular portion 23A and the bottom 23B.

Example 1

A fatigue test was conducted on two sample retainers for a chain tensioner according to Example 1 of the invention and two sample retainers for a chain tensioner according to a Comparative Example.

The retainers all have a wall thickness of 0.5 mm. In Example 1 of the invention, the opening is formed by punching each retainer from inside to outside as shown in FIGS. 3 and 4. In the Comparative Example, the opening is formed by punching each retainer from outside to inside as shown in FIGS. 9 and 10.

Loads of 30 N were applied with a frequency of 200 Hz to the bottom of each of the two sample retainers according to Example 1 of the invention and the two sample retainers of the Comparative Example. The number of loads applied to each sample was measured when fatigue failure occurred at the border between the bottom and the tubular portion of the retainer. The measurement results are shown in FIG. 5.

Figure 5:
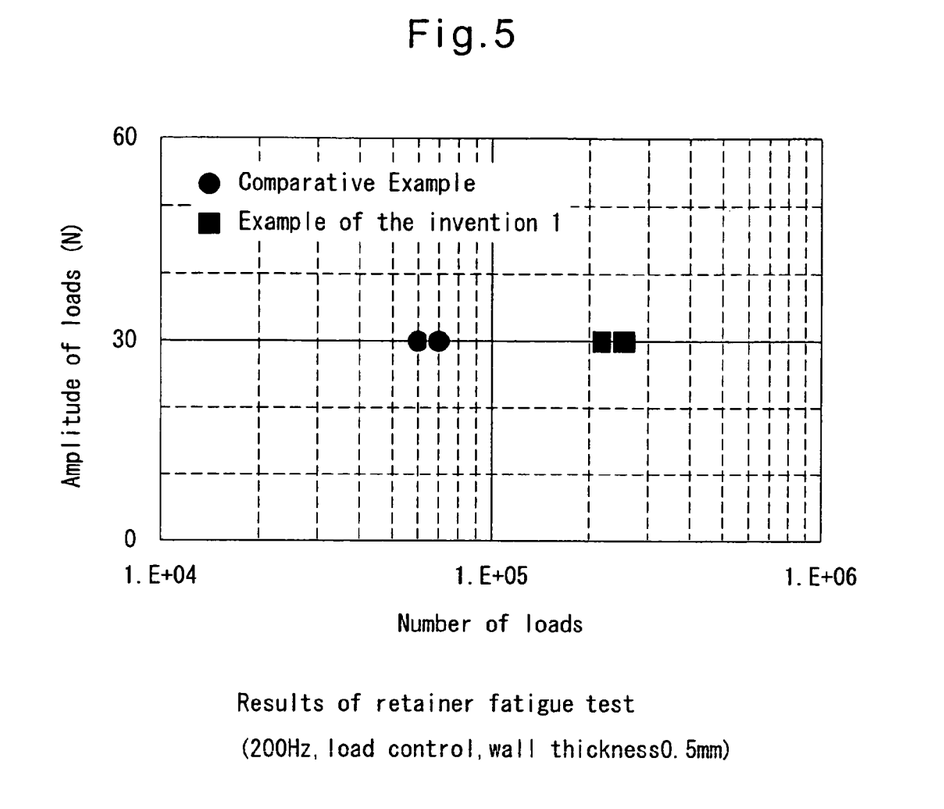
FIG. 5 is a graph showing the results of a fatigue test conducted on the retainer of the chain tensioner according to Example 1 of the invention, and a retainer of a chain tensioner of Comparative Example.

As shown in FIG. 5, while the retainers of the Comparative Example suffered fatigue failure when loads were applied by about $0.6 \times 10^5$ times, the retainers of Example 1 of the invention suffered fatigue failure when loads were applied by about $2 \times 10^5$ times. This means that the durability of the retainers according to Example 1 of the invention is 3.3 times higher than that of the retainers of the Comparative Example.

The test results thus confirm that the retainers having their openings formed by punching each retainer from inside to outside are far more durable than the retainers having their openings formed by punching each retainer from inside to outside.

Example 2

A fatigue test was conducted on two sample retainers for a chain tensioner according to Example 2 of the invention and two sample retainers for a chain tensioner according to a Reference Example.

Figure 6:
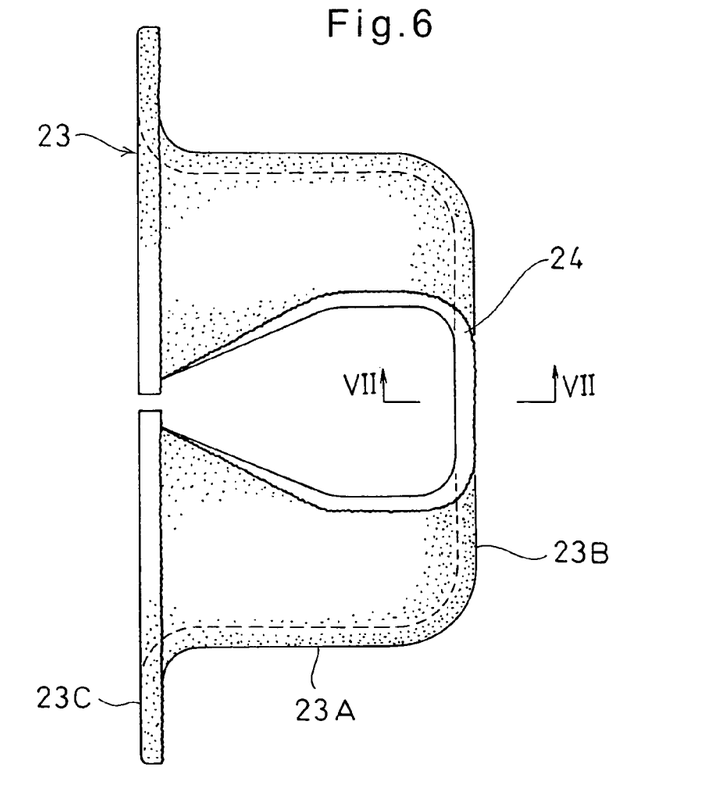
FIG. 6 is an enlarged view of a retainer of a check valve according to Example 2 of the invention.
Figure 7:
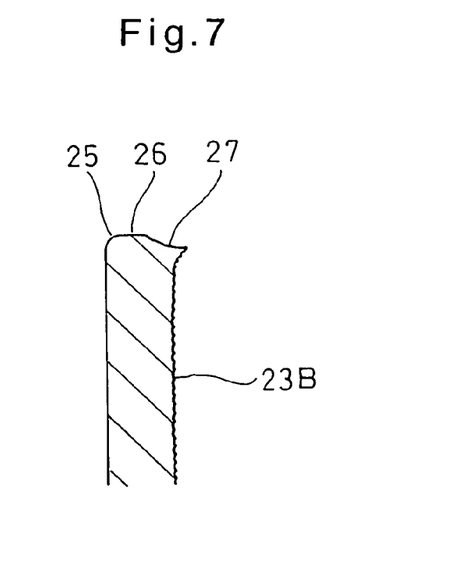
FIG. 7 is an enlarged sectional view taken along VII-VII of FIG. 6.

The retainers are all made of steel and have the same wall thickness with the opening thereof formed by punching each retainer from inside to outside. Also, the retainers are all subjected to carbonitriding/quenching. The retainers according to Example 2 of the invention have their surfaces subjected to shot peening as shown in FIGS. 6 and 7. The retainers of the Reference Example are not subjected to such shot peening.

The shot peening of the retainers according to Example 2 of the invention was carried out by throwing shots having diameters of 50 μm against the surface of each retainer at a speed of 50 m/minute. By this shot peening, the surface of each retainer is repeatedly and quickly cooled and heated within the temperature range higher than the A3 transformation point.

Loads of 30 N were applied with a frequency of 200 Hz to the bottom of each of the two sample retainers according to Example 2 of the invention and the two sample retainers of the Reference Example. The number of loads applied to each sample was measured when fatigue failure occurred at the border between the bottom and the tubular portion of the retainer. The measurement results are shown in FIG. 8.

Figure 8:
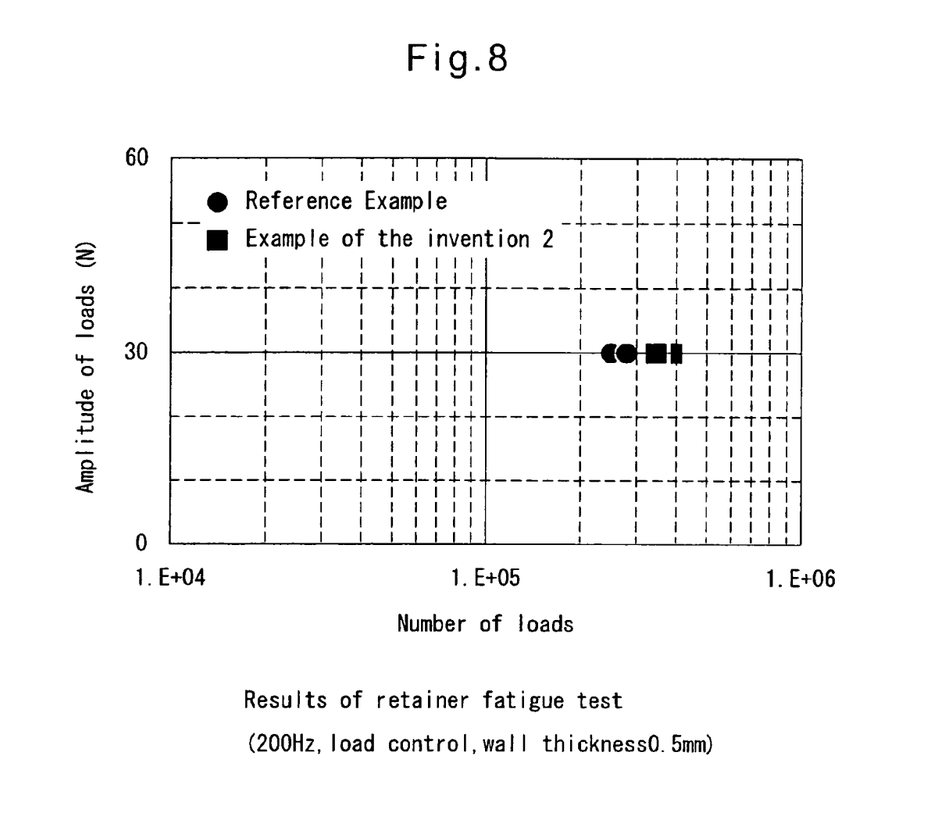
FIG. 8 is a graph showing the results of a fatigue test conducted on the retainer of the chain tensioner according to Example 2 of the invention, and a retainer of a chain tensioner of Reference Example.

As shown in FIG. 8, while the retainers of the Reference Example suffered fatigue failure when loads were applied by about $1.2 \times 10^5$ times, the retainers of Example 2 of the invention suffered fatigue failure when loads were applied by about $1.3 \times 10^5$ times. This means that the durability of the retainers according to Example 2 of the invention is higher by about 10% than that of the retainers of Reference Example.

The test results thus confirm that the retainers having respective surfaces that are subjected to shot peening in which the surface temperature of the retainer is increased to the A3 transformation point or over are more durable than the retainers that are not subjected to such shot peening.

What is claimed is:

1. A chain tensioner comprising:
   a cylinder having a closed end;
   a plunger axially slidably inserted in said cylinder for pressing a chain, said plunger defining in said cylinder a pressure chamber, to be filled with hydraulic oil, such that a volume of said pressure chamber is variable with axial movement of said plunger, said pressure chamber communicating with an outside of said cylinder through a restricted passage defined between sliding surfaces of said plunger and said cylinder;
   a spring biasing said plunger in a direction to increase the volume of said pressure chamber, said cylinder being formed with an oil supply passage through which said pressure chamber communicates with the outside of said cylinder; and
   a check valve which allows only a flow of hydraulic oil through said oil supply passage from the outside of said cylinder to said pressure chamber;
   wherein said check valve comprises an annular valve seat, a check ball which is movable into and out of contact with said valve seat, and a retainer retaining said check ball and being formed by drawing;
   wherein said retainer comprises a tubular portion and a bottom at a first end of said tubular portion;
   wherein said tubular portion of said retainer is formed with an opening, which communicates between an interior and an exterior of said retainer, through which hydraulic oil can flow into and out of said retainer; and
   wherein said opening extends to a junction of said tubular portion and said bottom of said retainer and is formed by punching said tubular portion from inside to outside thereof such that said opening is defined by a punched edge surface including a shear surface portion and a ruptured surface portion located outwardly of said shear surface portion, said ruptured surface portion being rougher than said shear surface portion.

2. The chain tensioner of claim 1 wherein said retainer is formed by drawing a circular blank having first and second sides such that said first and second sides of said blank become outer and inner sides of said retainer, respectively, said opening being formed by punching said blank before said blank is formed into said retainer by drawing, wherein a punched section formed by punching said blank comprises a ruptured surface and a shear surface located nearer to second side than is said ruptured surface.

3. The chain tensioner of claim 2 wherein said retainer is made of steel and is subjected to soft nitriding, carburizing/quenching or carbonitriding/quenching.

4. The chain tensioner of claim 3 wherein the surface of the retainer is subjected to shot peening.

5. The chain tensioner of claim 4 wherein said shot peening is carried out so as to raise the surface temperature of the retainer to an A3 transformation point or higher.

6. The chain tensioner of claim 5 wherein said shot peening is carried out by throwing shots having diameters of 20 to 200 μm against the surface of the retainer at a speed of 50 m/minute.

7. The chain tensioner of claim 1 wherein said retainer is made of steel and is subjected to soft nitriding, carburizing/quenching or carbonitriding/quenching.

8. The chain tensioner of claim 7 wherein the surface of the retainer is subjected to shot peening.

9. The chain tensioner of claim 8 wherein said shot peening is carried out so as to raise the surface temperature of the retainer to an A3 transformation point or higher.

10. The chain tensioner of claim 9 wherein said shot peening is carried out by throwing shots having diameters of 20 to 200 μm against the surface of the retainer at a speed of 50 m/minute.

11. The chain tensioner of claim 1, wherein said punched edge surface further includes a rounded surface portion located inwardly of said shear surface portion.

12. The chain tensioner of claim 11, wherein said retainer further comprises a radially outwardly extending flange at a second end of said tubular portion.

13. The chain tensioner of claim 12, wherein said opening extends to said junction of said tubular portion and said bottom of said retainer from an outer edge of said radially outwardly extending flange.

14. The chain tensioner of claim 1, wherein said retainer further comprises a radially outwardly extending flange at a second end of said tubular portion.

15. The chain tensioner of claim 14, wherein said opening extends to said junction of said tubular portion and said bottom of said retainer from an outer edge of said radially outwardly extending flange.

* * * * *